(12) United States Patent
Cornwall et al.

(10) Patent No.: US 8,341,747 B2
(45) Date of Patent: Dec. 25, 2012

(54) METHOD TO PROVIDE A SECURE VIRTUAL MACHINE LAUNCHER

(75) Inventors: Andrew Cornwall, Phoenix, AR (US); Jimmie E. Dewitt, Jr., Georgetown, TX (US); David P. Dutcher, Austin, TX (US); Frederick J. Gnuechtel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 11/463,080

(22) Filed: Aug. 8, 2006

(65) Prior Publication Data
US 2008/0047015 A1 Feb. 21, 2008

(51) Int. Cl.
*G06F 21/00* (2006.01)
(52) U.S. Cl. ........... 726/25; 713/191; 713/192; 713/193
(58) Field of Classification Search .......... 713/191–193; 726/25
See application file for complete search history.

(56) References Cited

U.S. PATENT DOCUMENTS

| 5,757,914 | A | 5/1998 | McManis | |
|---|---|---|---|---|
| 6,874,084 | B1 | 3/2005 | Dobner et al. | |
| 6,950,932 | B1 | 9/2005 | Lavian et al. | |
| 7,103,529 | B2 * | 9/2006 | Zimmer | 703/27 |
| 2002/0161996 | A1 * | 10/2002 | Koved et al. | 713/150 |
| 2002/0169987 | A1 * | 11/2002 | Meushaw et al. | 713/201 |
| 2003/0018909 | A1 | 1/2003 | Cuomo et al. | |
| 2003/0065827 | A1 | 4/2003 | Skufca et al. | |
| 2003/0135746 | A1 * | 7/2003 | Abbott et al. | 713/193 |
| 2004/0019809 | A1 | 1/2004 | Sheinis et al. | |
| 2004/0025022 | A1 * | 2/2004 | Yach et al. | 713/176 |
| 2004/0039926 | A1 | 2/2004 | Lambert | |
| 2005/0097052 | A1 | 5/2005 | Systa et al. | |
| 2005/0097343 | A1 | 5/2005 | Altenhofen | 713/191 |
| 2005/0160161 | A1 | 7/2005 | Barrett | |
| 2005/0251459 | A1 * | 11/2005 | Kim et al. | 705/26 |
| 2007/0074034 | A1 * | 3/2007 | Adams et al. | 713/176 |
| 2007/0256069 | A1 * | 11/2007 | Blackman et al. | 717/170 |

OTHER PUBLICATIONS

Curphey, "Web application security assessment tools", 2006, Security & Privacy, IEEE, vol. 4, pp. 32-41.*
Almut Herzog, et al, "An Evaluation of Java Application Containers According to Security Requirements", Dept. of Computer and Information Science, Proceedings of the 14*th* IEEE International Workshops on Enabling Technologies: Infrastructure for Collaborative Enterprise, 2005 IEEE.
David M. Wheeler, et al, "Java Security Extensions for a Java Server in a Hostile Environment", Intel Corporation.

* cited by examiner

*Primary Examiner* — Taghi Arani
*Assistant Examiner* — Gregory Lane
(74) *Attorney, Agent, or Firm* — Brevetto Law Group (57) ABSTRACT

A method of operating a virtual machine includes determining a virtual machine signature, receiving an execution request from an application, and determining an application signature based on the request. The method further includes validating the application signature to the virtual machine signature and executing the application based on the validation.

22 Claims, 9 Drawing Sheets

METHOD TO PROVIDE A SECURE VIRTUAL MACHINE LAUNCHER

FIELD OF INVENTION

The present invention generally relates to virtual machines. More specifically, the invention relates to executing applications in a secure virtual machine.

BACKGROUND OF THE INVENTION

Security is an important goal for software and hardware providers. Providers are continually challenged to reduce possible vulnerabilities. The creation of virtual machines has helped meet this goal, as any harm from operation of an application within the virtual machine is contained within the virtual machine itself, rather than spreading to the general framework of the executing device. However, maintenance of a secure virtual machine can increase satisfaction by reducing negative experiences.

Previous attempts to increase virtual machine security have focused on the application. For example, the JAVA® virtual machine offered by SUN® includes a "jarsigner" tool which allows users to lock the application. Other attempted solutions have focused on hardware. Yet other proposed solutions focus on signatures. However, none of these proposed solutions allow a virtual machine creator to select the applications that are executable within their environment.

It is therefore a challenge to develop a method to overcome these, and other, disadvantages.

SUMMARY OF THE INVENTION

A first aspect of the invention includes a method of operating a virtual machine. The method includes determining a virtual machine signature and receiving an execution request from an application. The method further includes determining an application signature based on the request, validating the application signature to the virtual machine signature, and executing the application based on the validation.

Another aspect of the invention includes a computer readable medium including computer readable code for operating a virtual machine. The medium includes computer readable code for determining a virtual machine signature and computer readable code for receiving an execution request from an application. The medium further includes computer readable code for determining an application signature based on the request, computer readable code for validating the application signature to the virtual machine signature, and computer readable code for executing the application based on the validation.

Yet another aspect of the invention includes a system for operating a virtual machine. The system includes means for determining a virtual machine signature and means for receiving an execution request from an application. The system further includes means for determining an application signature based on the request, means for validating the application signature to the virtual machine signature, and means for executing the application based on the validation.

The foregoing aspects and objects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1A:
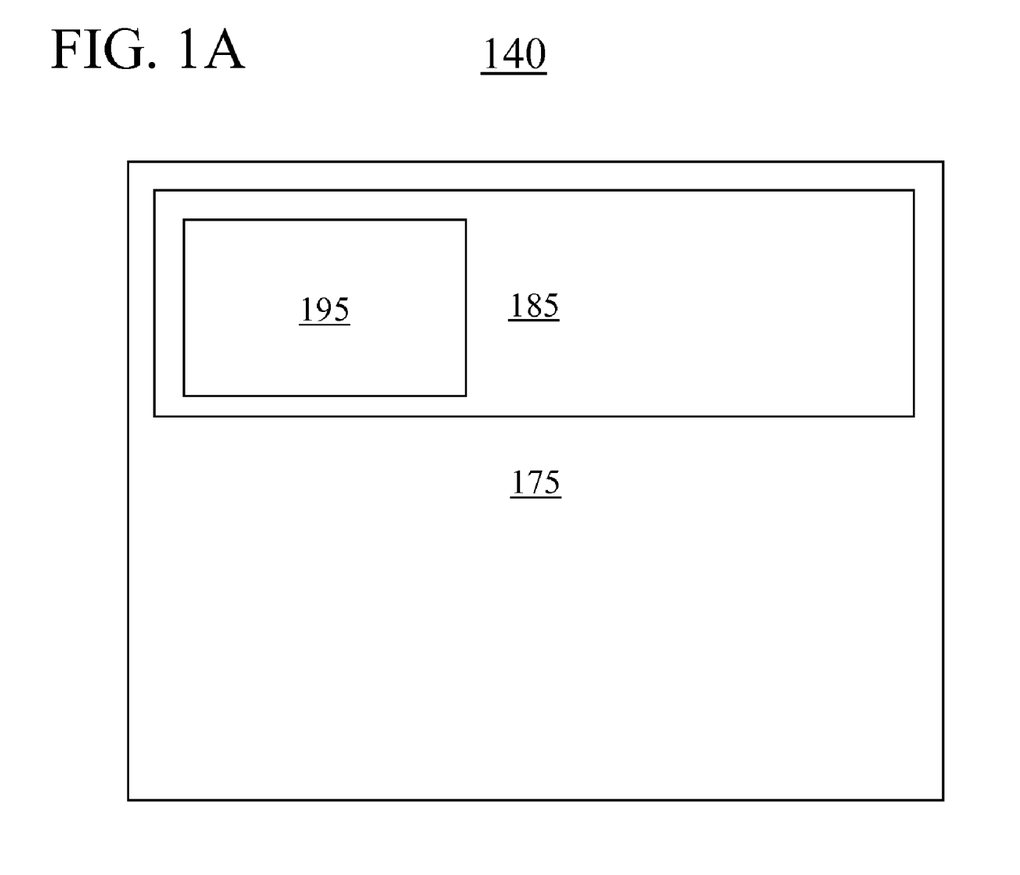
FIG. 1A illustrates one embodiment of a system for operating a virtual machine in accordance with the invention.

FIG. 1A is a graphical illustration of one aspect of a system for operating a virtual machine in accordance with the invention at 140. The system includes an operating system 175 executing a virtual machine 185. The virtual machine 185 in turn executes application 195. The operating system 175 can be any appropriate operating system such as WINDOWS®, AIX®, UNIX®, or the like. The virtual machine 185 is any software configured to insulate the operating system 175 from actions of application 195. Application 195 is any software configured to produce at least one output based on at least one input.

Figure 1B:
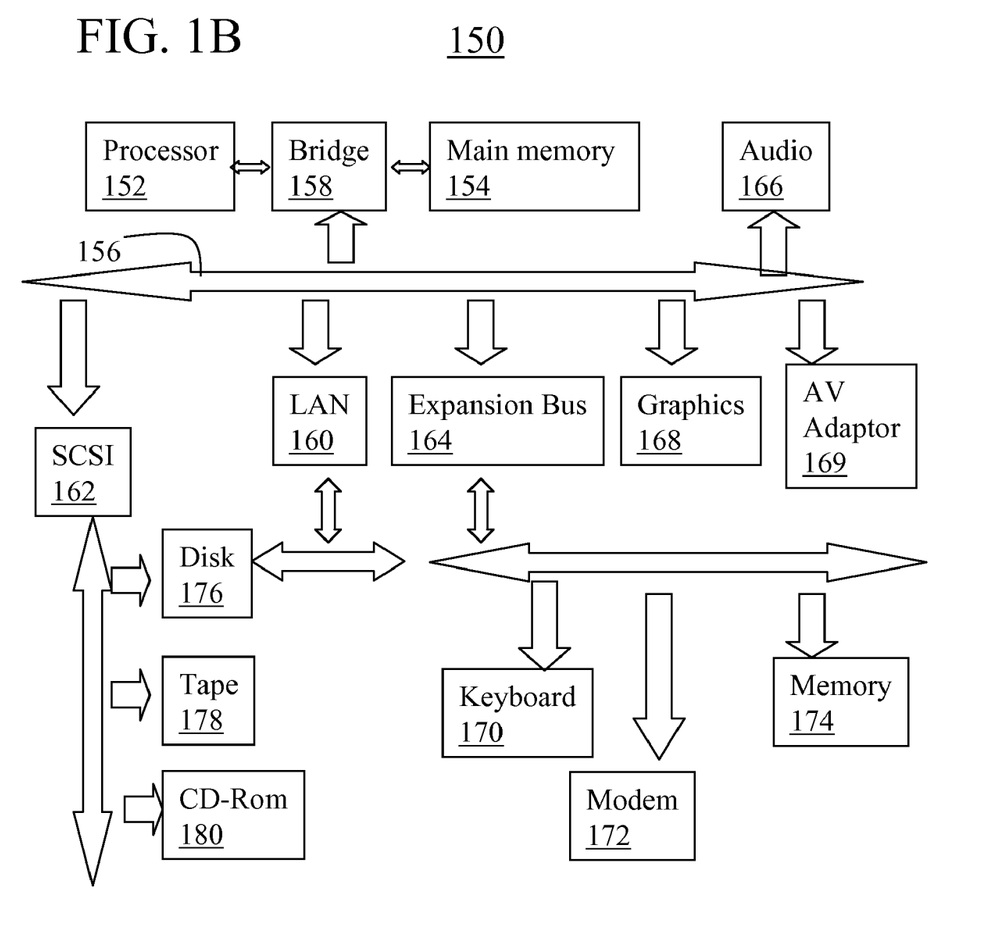
FIG. 1B illustrates one embodiment of a computer client, in accordance with one aspect of the invention.
Figure 2:
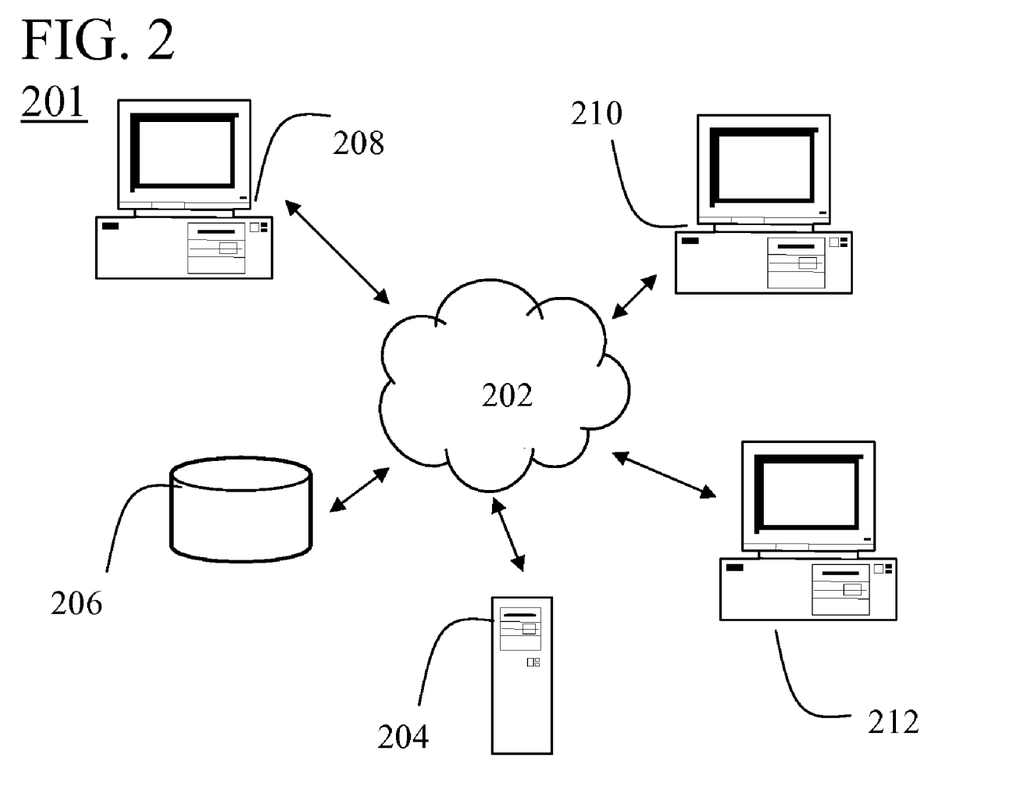
FIG. 2 illustrates one embodiment of a network system for use in accordance with one aspect of the invention

FIG. 1B illustrates one embodiment of a computer system 150 for use in accordance with one aspect of the invention. Computer system 150 is an example of a client computer, such as clients 208, 210, and 212 (FIG. 2). Computer system 150 employs a peripheral component interconnect (PCI) local bus architecture. Although the depicted example employs a PCI bus, other bus architectures such as Micro Channel, AGP, EISA, and VESA Local may be used. PCI bridge 158 connects processor 152 and main memory 154 to PCI local bus 156. PCI bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 156 by add-in boards inserted into expansion slots. Expansion bus interface 164 connects a keyboard and mouse adapter 170, modem 172, and additional memory 174 to bus 156. SCSI host bus adapter 162 provides a connection for hard disk drive 176, tape drive 178, and CD-ROM 180 in the depicted example. In one embodiment, the PCI local bus implementation support three or four PCI expansion slots or add-in connectors, although any number of PCI expansion slots or add-in connectors can be used to practice the invention.

An operating system runs on processor 152 to coordinate and provide control of various components within computer system 150. The operating system may be any appropriate available operating system such as Windows, Macintosh, UNIX, or LINUX. Instructions for the operating system, an object-oriented operating system, and applications or programs are located on storage devices, such as hard disk drive 176 and may be loaded into main memory 154 for execution by processor 152.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. FIG. 1 does not illustrate any architectural limitations with respect to the present invention, and rather merely discloses an exemplary system that could be used to practice the invention. For example, the processes of the present invention may be applied to multi-processor data processing system.

FIG. 2 illustrates an exemplary network system 201. Network system 201 is illustrative only, and is not an architectural limitation for the practice of this invention. Network system 201 is a network of computers in which the present invention may be implemented. Network system 201 includes network 202, which is the medium used to provide communications links between various devices and computers connected together within distributed network system 201. Network 202 may include permanent connections, such as wire or fiber optic cables, or temporary connections made through telephone connections. In other embodiments, network 202 includes wireless connections using any appropriate wireless communications protocol including short range wireless protocols such as a protocol pursuant to FCC Part 15, including 802.11, Bluetooth or the like, or a long range wireless protocol such as a satellite or cellular protocol.

In FIG. 2, a server 204 is connected to network 202 along with storage unit 206. In addition, clients 208, 210, and 212 also are connected to a network 202. These clients 208, 210, and 212 may be, for example, personal computers or network computers. For purposes of this application, a network computer is any computer, coupled to a network, which receives a program or other application from another computer coupled to the network. In the depicted example, server 204 provides data, such as boot files, operating system images, and applications to clients 208-212. Clients 208, 210, and 212 are clients to server 204. Network system 201 may include additional servers, clients, and other devices not shown. In the depicted example, network system 201 is the Internet with network 202 representing a worldwide collection of networks and gateways that use the TCP/IP suite of protocols to communicate with one another. Network system 201 also may be implemented as a number of different types of networks, such as for example, an intranet or a local area network.

Figure 3:
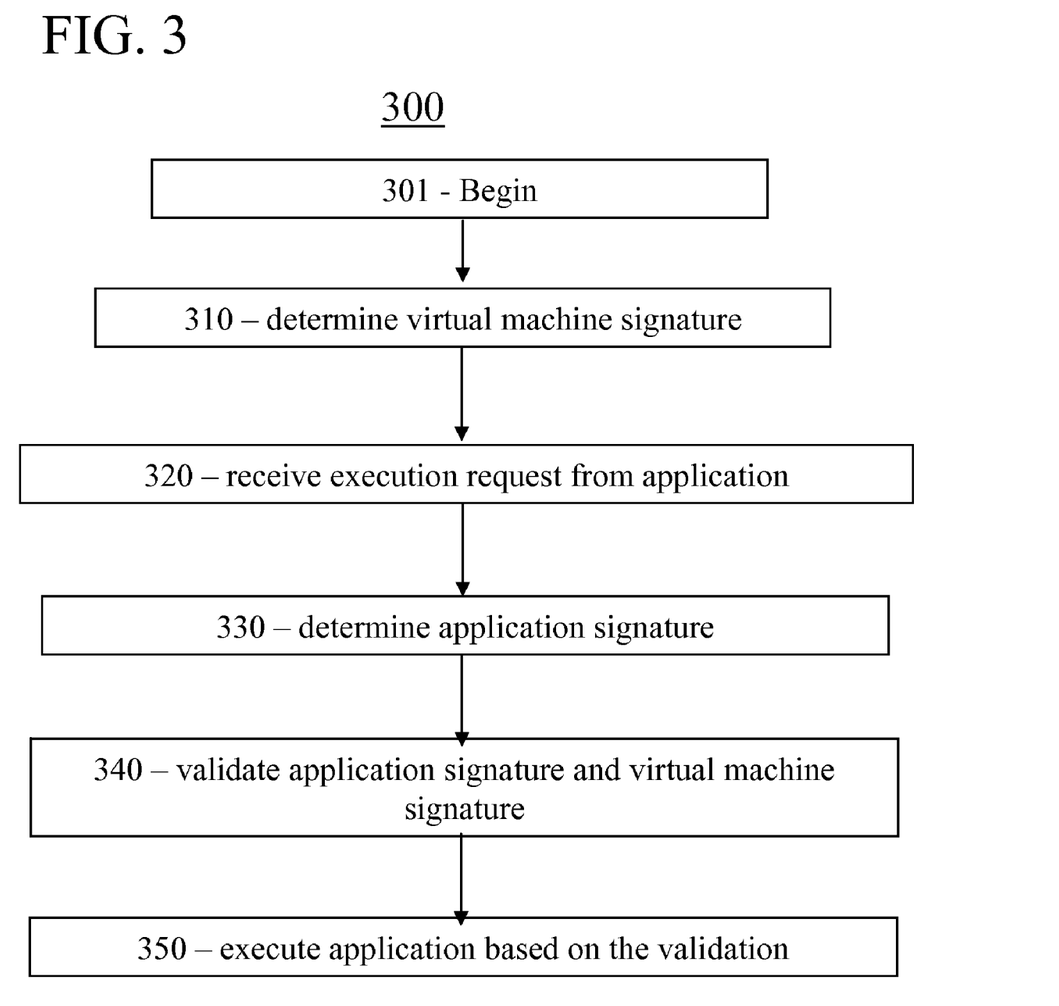
FIG. 3 illustrates one embodiment of a method for operating a virtual machine, in accordance with one aspect of the invention.

FIG. 3 illustrates one embodiment of a method 300 for operating a virtual machine in accordance with one aspect of the invention. Method 300 begins at step 301.

The virtual machine determines a virtual machine signature at step 310. A virtual machine signature is a data string representative of the sponsor of the virtual machine. The sponsor of the virtual machine can be the author, creator, distributor, security guarantor, or any other entity responsible for the operation of the virtual machine. The virtual machine signature can be any appropriate data, such as a digital signature, encrypted identifier or other similar indicia of origin or control. The determination of the virtual machine signature can occur during a boot sequence or opening sequence of the virtual machine. Alternatively, the determination can occur upon execution of an application within the virtual machine. The determination can be based on polling a memory location within the device executing the virtual machine, or by polling a network location such as over a packet data based network such as the Internet or an intranet. In one embodiment, the virtual machine launcher includes the virtual machine signature such that execution of the virtual machine launcher results in determination of the virtual machine signature prior to execution of any executable within the virtual machine. The virtual machine can be implemented as any available virtual machine that operates using bytecodes, such as JAVA®, LISP®, or the like. For example, the virtual machine can be the JAVA® Virtual Machine ("JVM") or the J2ME J9 JVM.

Method 300 continues at step 320 by receiving, at the virtual machine, an execution request from an application. The application can be any application requesting execution within the virtual machine. The execution request is any message received by the virtual machine that indicates that the application is preparing to execute within the virtual machine, or to utilize resources allocated to the virtual machine. For example, the application can be a Java Archive File ("JAR") or Java Executable ("JXE").

Based on receiving the execution request, the virtual machine determines an application signature from the application. The application signature is determined prior to execution of the application. The application signature can be any appropriate data, such as a digital signature, encrypted identifier or other similar indicia of origin or control. The application signature can be maintained within the application files or libraries or in a location accessible to the application and/or virtual machine, such as a networked connection.

The application signature and virtual machine signature can take the same or similar forms. Alternatively, the application signature and virtual machine signature can take different forms. In one embodiment, the application signature and virtual machine signature form a matched pair. In one embodiment, the application signature and virtual machine signature are a private and public key, such as in a PKI encryption scheme. In another embodiment, neither of the key pair is a public key.

Figure 4:
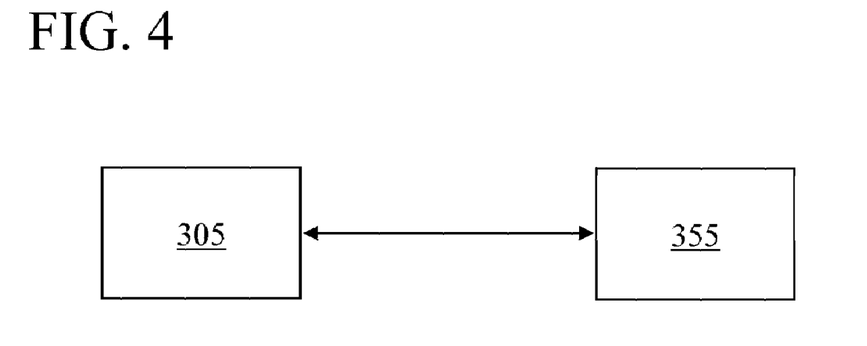
FIG. 4 schematically illustrates a matched pair of virtual machine signature and application signature, in accordance with one aspect of the invention.

The application signature and virtual machine signature are validated at step 340. Validating the application signature and virtual machine signature can include a direct comparison, an indirect comparison, or any other validation technique. The validation occurs, in one embodiment, as the bytecodes of the application (i.e. from a JAVA® class file or LISP® library, etc.) are loaded into the virtual machine. FIG. 4 illustrates a validation between the virtual machine signature 305 and application signature 355.

Based on the validation, the application is executed within the virtual machine at step 350. In one embodiment, the application will not execute based on a failed validation, or if the application signature and virtual machine signature fail to match. In one embodiment, an error message is issued based on a failure of the application signature and virtual machine signature to match. In another embodiment, the application successfully executes based on a proper match between the application signature and virtual machine signature. In one embodiment, the error message is a diagnostic message relating to the source or cause of the error condition.

Figure 5:
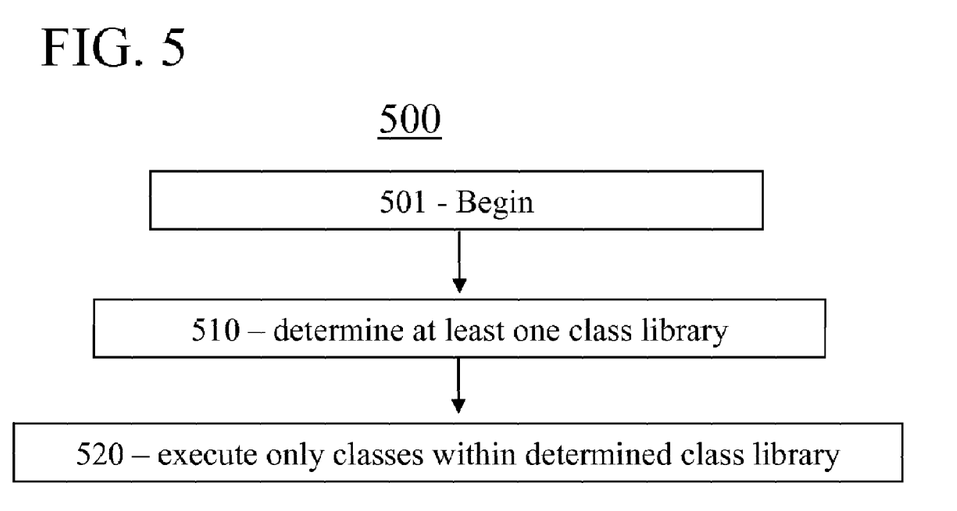
FIG. 5 illustrates one embodiment of a method for operating a virtual machine, in accordance with one aspect of the invention.

FIG. 5 illustrates one example of a method 500 for executing applications within a virtual machine, in accordance with one aspect of the invention. Method 500 begins at 501, and continues by determining at least one class library, based on the step 340 validation at step 510. Based on the determined class library, method 500 will execute only classes within the determined class library at step 520. For example, a given application signature may limit the accessibility of certain class libraries, while allowing execution of the application within the virtual machine.

In one embodiment, method 300 further includes sending an external condition request based on the validation. In one embodiment, the external condition request includes an error message indicating the failure of the validation to indicate ability to execute on the virtual machine.

Figure 6:
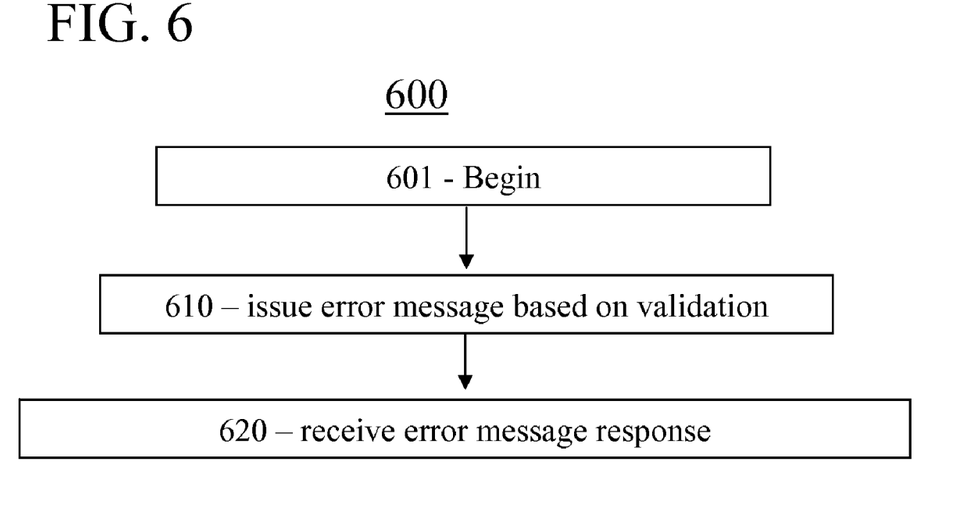
FIG. 6 illustrates one embodiment of a method for operating a virtual machine, in accordance with one aspect of the invention.

FIG. 6 illustrates one embodiment of a method 600 for sending an error message in accordance with one aspect of the invention. Method 600 begins at step 601, and continues at step 610 by issuing the error message based on the validation. Having issued the error message, method 600 then receives an error message response at step 620.

In an exemplary embodiment, the error message includes a request for a user to input a data string. For example, the data string can be a signature obtained via payment with an authorized source. Alternatively, the error message can be a file path to access the application signature in the event that the virtual machine was not able to physically locate an application signature. In yet another embodiment, the error message seeks an input of an authorization code from a user and/or application.

Alternatively, the external condition request can be linked to a physical parameter, such as a geographical location or a condition of another device. For example, a virtual machine can operate within a mobile vehicle. In a mobile vehicle environment, certain applications are undesirable to operate while the vehicle is under certain conditions, such as moving, or a convertible top down, the lights are on, the radio is on, or the like. Thus, in one embodiment, the external condition request is sent to a vehicle system via a vehicle communications bus to determine, for example, a condition of the vehicle, such as speed, light status, audiovisual equipment status, or the like.

In other embodiments, the external condition is a geographical location of the device running the virtual machine and/or application. The geographical location can be determined by polling a memory location, geolocating service such as the services offered by QUOVA®, GPS device, or other positional determination device such as a locator of a mobile communications device. Based on the geographical location, the virtual machine can either execute or fail to execute the application. For example, certain virtual machines can refuse to execute applications while the device is in a certain area, or not in the area.

In another embodiment, the environment is a mobile communications device, such as a cell phone or personal digital assistant. In such environments, the external condition request includes determining a virtual machine carrier network associated with the virtual machine, and determining an application carrier network associated with the application. In such an example, the carrier network upon which the virtual machine operates can exclude applications associated with competitive carrier networks, or other unauthorized applications from executing on virtual machines associated with the carrier network. Alternatively, the carrier network can reduce security breaches from unauthorized access to the carrier network from malicious applications.

Figure 7:
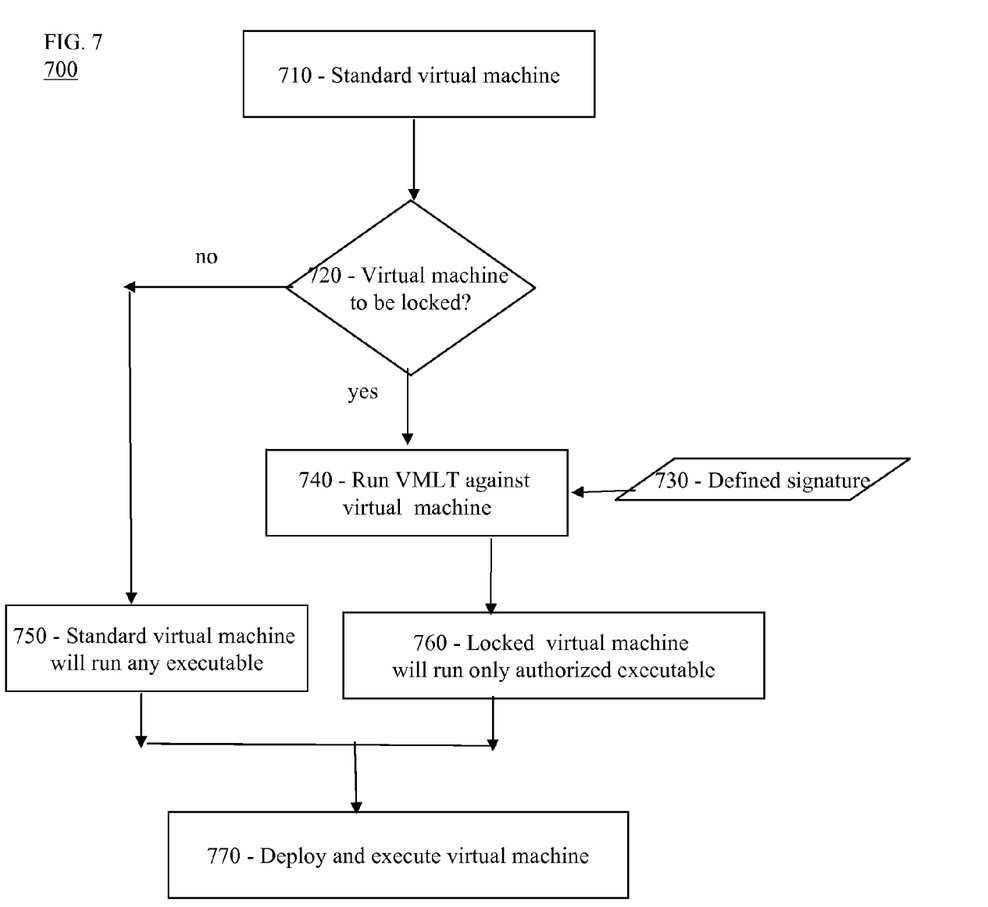
FIG. 7 illustrates one embodiment of a method for operating a virtual machine, in accordance with one aspect of the invention.

In one embodiment, a virtual machine author creates a Virtual Machine Locking Tool ("VMLT") to lock the authored virtual machine against execution of unauthorized executables. FIG. 7 illustrates one embodiment of a method 700 for using a VMLT on a virtual machine. At step 710, a standard virtual machine is provided, and at step 720, method 700 determines whether to lock the standard virtual machine with a signature. If no signature is to be locked, method 700 proceeds to step 750 such that the standard virtual machine will execute any executable, and the standard virtual machine is deployed and executed at step 770.

If method 700 determines that the virtual machine is to be signature locked at step 720, the VMLT is run against the virtual machine at step 740. Running the VMLT against the virtual machine includes encoding a digital signature within the virtual machine, such as cryptographically, such that the digital signature can be retrieved upon execution of the virtual machine. The defined signature 730 is added to the virtual machine, and the locked virtual machine will only run authorized or signed executable applications at step 760. The locked virtual machine is then deployed and executed at step 770.

Figure 8:
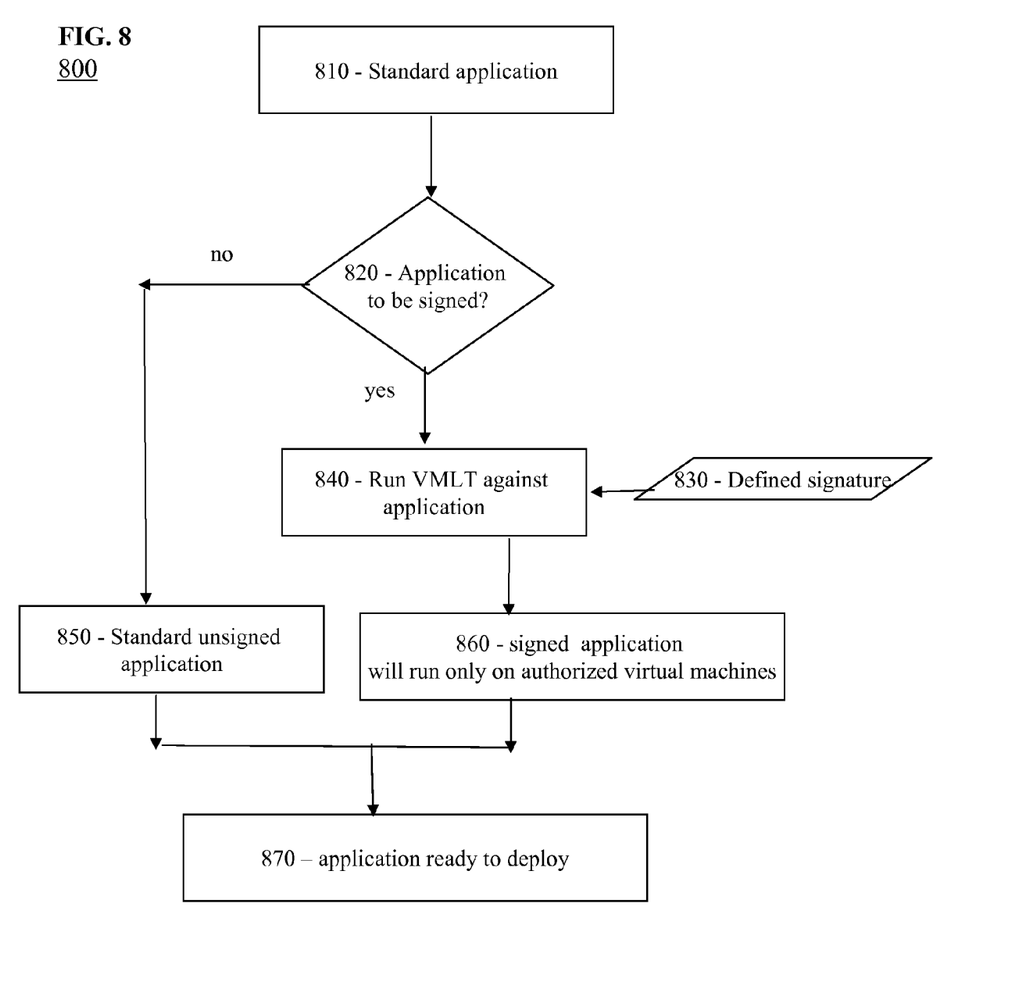
FIG. 8 illustrates one embodiment of a method for operating a virtual machine, in accordance with one aspect of the invention.

FIG. 8 illustrates one example of a method 800 for using a VMLT on an application, in accordance with one aspect of the invention. Method 800 begins at 810 with a standard application. At step 820, method 800 determines whether the application is to be signed. Signing the application will result in the application only being executable on signed virtual machines, such that the signature in the virtual machine matches the signature in the application.

If the application is not to be signed, method 800 proceeds to step 850 where the standard unsigned application is ready to deploy at 870. In the event that the application is to be signed, the VMLT is run against the application at step 840 using the defined signature 830. Having run the VMLT against the application, the signed application is, at step 860, only executable on signed virtual machines, and ready to deploy at step 870.

Figure 9:
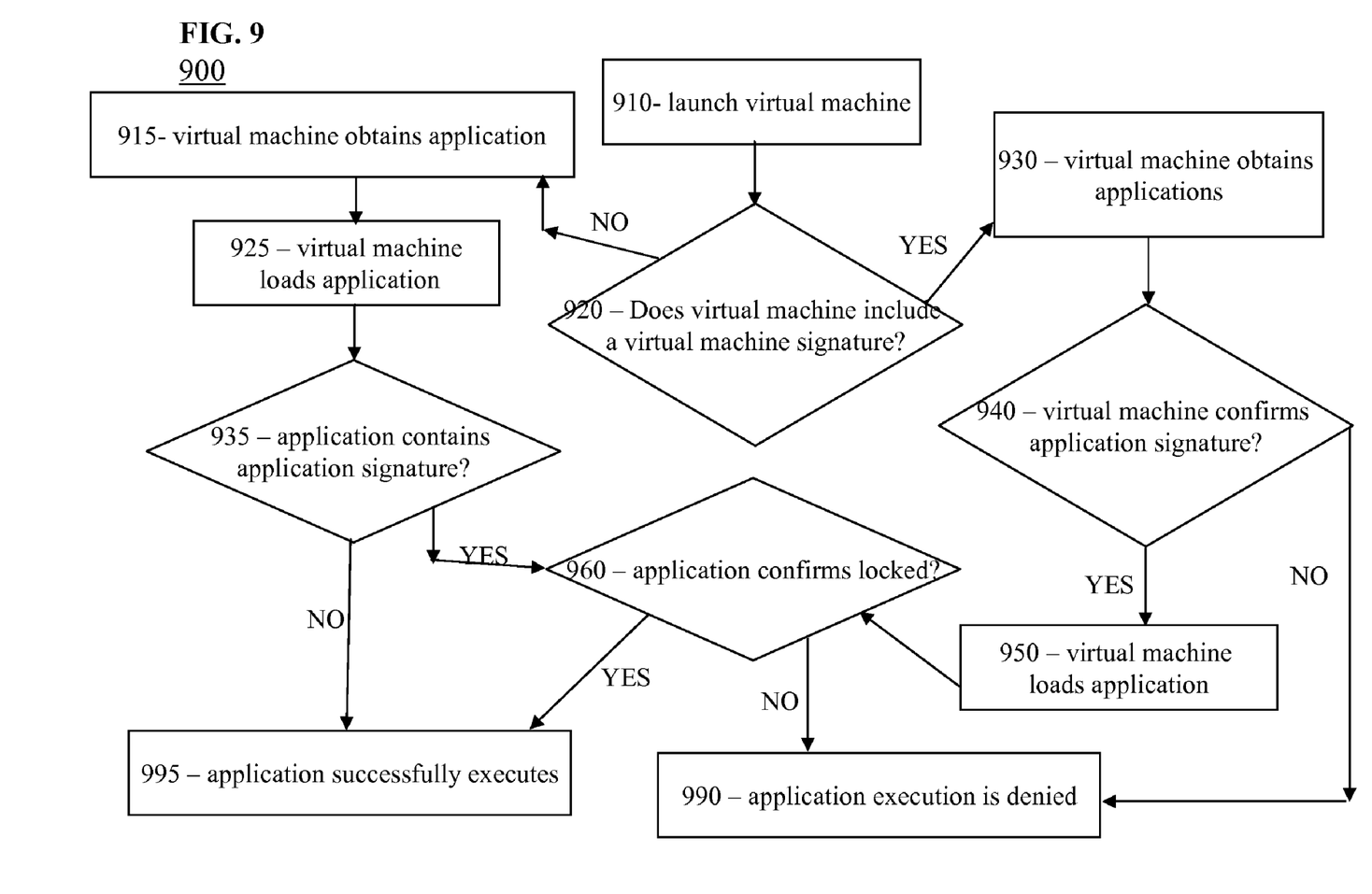
FIG. 9 illustrates one embodiment of a method for operating a virtual machine, in accordance with one aspect of the invention.

FIG. 9 illustrates another method 900 for operating a virtual machine 900 in accordance with an aspect of the invention. Method 900 begins at step 910 by launching the virtual machine, and determining whether the virtual machine includes a virtual machine signature at step 920. In the event that the virtual machine does not include a virtual machine signature, method 900 proceeds to 915 to obtain an application at the virtual machine, and load the application in the virtual machine at step 925. At step 935, method 900 determines whether the application contains an application signature, and if no, the application executes at step 995. In the event that the application does contain an application signature, method 900 proceeds to step 960 to confirm that the application is unlocked, and if yes, executes the application at step 995 If the application is not unlocked, method 900 then denies execution at step 990, and optionally, generates an error message or determines an external condition, as discussed above.

If the virtual machine does contain a signature at step 920, then method 900 continues to step 930 to obtain at least one application, and confirm that the application includes an application signature and that the application signature matches the virtual machine signature at step 940. If the application signature and virtual machine signature do not match at step 940, method 900 continues to deny execution at step 990, and optionally, generates an error message or determines an external condition, as discussed above.

In the event that the application signature and virtual machine signature do match at step 940, method 900 proceeds to load the application at step 950, and proceeds to step 960 to confirm that the application is unlocked, and if yes, executes the application at step 995 If the application is not unlocked, method 900 then denies execution at step 990, and optionally, generates an error message or determines an external condition, as discussed above.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a recordable type medium such as semiconductor or solid-state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of operating a virtual machine, the method comprising:
    determining, by the virtual machine, a virtual machine signature by polling a predefined storage location of the virtual machine signature;
    receiving an execution request, on one or more computing devices, from an application;
    determining an application signature based on the request;
    associating the virtual machine with the virtual machine signature;
    associating the application with the application signature;
    validating the application signature to the virtual machine signature; and
    executing the application based on the validation determining that the application is authorized for execution on said virtual machine;
wherein the virtual machine signature is a data string representative of a sponsor of the virtual machine, and the virtual machine is configured to allow the sponsor to control authorization for execution of the application on said virtual machine.

2. The method of claim 1 wherein the virtual machine signature and the application signature are a matched pair.

3. The method of claim 1 wherein executing the application based on the validation comprises:
    determining at least one class library based on the validation; and
    executing only classes within the determined at least one class library.

4. The method of claim 1 wherein the validating of the application signature further comprises:
    sending an external condition request based on the validation;
    issuing an error message based on the validation; and
    receiving an error message response responsive to the issued error message.

5. The method of claim 4, wherein the error message includes either a request for an authorization code or a request for payment.

6. The method of claim 4 wherein the sending a of the external condition request based on the validation comprises:
    determining a virtual machine carrier network associated with the virtual machine; and
    determining an application carrier network associated with the application.

7. The method of claim 1 wherein the virtual machine is selected from the group consisting of Java Virtual Machine, SmallTalk Virtual Machine, LISP Virtual Machine and a bytecode Virtual Machine.

8. The method of claim 1 wherein the determination of a virtual machine signature is part of a boot sequence of the virtual machine.

9. A computer readable non-transitory storage medium including computer readable code for operating a virtual machine upon being executed on one or more computer devices, the medium comprising:
    computer readable code for determining, by the virtual machine, a virtual machine signature by polling a predefined storage location of the virtual machine signature;
    computer readable code for receiving an execution request, on one or more computing devices, from an application;
    computer readable code for determining an application signature based on the request;
    associating the virtual machine with the virtual machine signature;
    associating the application with the application signature;
    computer readable code for validating the application signature to the virtual machine signature; and
    computer readable code for executing the application based on the validation determining that the application is authorized for execution on said virtual machine;
    wherein the virtual machine signature is a data string representative of a sponsor of the virtual machine, and the virtual machine is configured to allow the sponsor to control authorization for execution of the application on said virtual machine.

10. The medium of claim 9 wherein executing the application based on the validation comprises:
    computer readable code for determining at least one class library based on the validation; and
    computer readable code for executing only classes within the determined at least one class library.

11. The medium of claim 9 wherein the validating of the application signature further comprises:
    sending an external condition request based on the validation;
    issuing an error message based on the validation; and
    receiving an error message response responsive to the issued error message.

12. The medium of claim 11, wherein the error message includes either a request for an authorization code or a request for payment.

13. A system for operating a virtual machine, the system comprising:
    means for determining, by the virtual machine, a virtual machine signature by polling a predefined storage location of the virtual machine signature;

means for receiving an execution request, on one or more computing devices, from an application;
means for determining an application signature based on the request;
associating the virtual machine with the virtual machine signature;
associating the application with the application signature;
means for validating the application signature to the virtual machine signature; and
means for executing the application based on the validation determining that the application is authorized for execution on said virtual machine;
wherein the virtual machine signature is a data string representative of a sponsor of the virtual machine, and the virtual machine is configured to allow the sponsor to control authorization for execution of the application on said virtual machine.

14. The method of claim 1, wherein the virtual machine signature matches the application signature; and
wherein the virtual machine will only execute applications for which the virtual machine signature matches the application signature.

15. The medium of claim 9, wherein the virtual machine signature matches the application signature; and
wherein the virtual machine will only execute applications for which the virtual machine signature matches the application signature.

16. The system of claim 13, wherein the virtual machine signature matches the application signature; and
wherein the virtual machine will only execute applications for which the virtual machine signature matches the application signature.

17. The method of claim 1, further comprising:
loading the application in response to the validation determining that the application is authorized for execution on said virtual machine.

18. The medium of claim 9, the steps further comprising:
loading the application in response to the validation determining that the application is authorized for execution on said virtual machine.

19. The system of claim 13, further comprising:
means for loading the application in response to the validation determining that the application is authorized for execution on said virtual machine.

20. The method of claim 1, wherein the virtual machine signature determined by the virtual machine is the virtual machine signature of the virtual machine.

21. The medium of claim 9, wherein the virtual machine signature determined by the virtual machine is the virtual machine signature of the virtual machine.

22. The system of claim 13, wherein the virtual machine signature determined by the virtual machine is the virtual machine signature of the virtual machine.

* * * * *